United States Patent [19]

Montgomery et al.

[11] 4,126,654

[45] Nov. 21, 1978

[54] ALUMINA OR ALUMINA-CHROMIA REFRACTORIES

[75] Inventors: Lionel C. Montgomery, Bay Village; Robert G. Fenish, Parma; Victor Mandorf, Jr., Olmsted Falls, all of Ohio

[73] Assignee: Union Carbide Corporation, New York, N.Y.

[21] Appl. No.: 760,458

[22] Filed: Jan. 18, 1977

[51] Int. Cl.$^2$ ............................................. C04B 35/64
[52] U.S. Cl. ........................................ 264/63; 106/66; 264/65; 264/66; 264/67; 264/332
[58] Field of Search .................... 106/66; 264/60, 332, 264/DIG. 36, 63, 65, 66, 67

[56] References Cited

U.S. PATENT DOCUMENTS

| | | | |
|---|---|---|---|
| 2,698,990 | 1/1955 | Conant | 264/DIG. 36 |
| 2,872,724 | 2/1959 | Conant | 264/DIG. 36 |
| 3,608,050 | 9/1971 | Corman | 264/332 |

OTHER PUBLICATIONS

Oxide Ceramics–Physical Chemistry & Technology, Eugene Ryshkewitch, Academic Press, N.Y. 1960 pp. 192–194.

Industrial Heating Magazine, Apr. 1976, pp. 38–74.

*Primary Examiner*—Thomas P. Pavelko
*Attorney, Agent, or Firm*—J. Hart Evans

[57] ABSTRACT

A method of producing improved fused alumina or fused alumina-chromia refractory bodies wherein the binder added to the fused grain powder prior to forming a slurry for molding contains chromium metal and unfused alumina.

36 Claims, No Drawings

ALUMINA OR ALUMINA-CHROMIA REFRACTORIES

BACKGROUND OF THE INVENTION

The present invention relates to refractory bodies or materials. More particularly it relates to fused chromia refractory bodies. Such materials have wide commercial application in many different areas. They are useful wherever resistance to erosion by hot gases, corrosive materials and the like present problems. Vessels and containers used in coal conversion and gasification processes, for example, must frequently be made of highly corrosion resistant refractory materials. Pouring tubes for casting steel and the like are other uses of such refractories.

PRIOR ART

The use of alumina or aluminum oxide as a fused refractory material is well known in the art. It goes back many years. It is also well known in the art that the addition of chromia or chromium oxide to the alumina will greatly improve the properties of the refractory produced from the mixture as compared to the alumina refractory alone. The advantages of using chromia with the alumina are discussed in the book "Oxide Ceramics Physical Chemistry and Technology" by Eugene Ryshkewitch, Academic Press, New York, 1960. Further discussion of bonded fused grain refractories including those with alumina and chromia is to be found in the April 1976 issue of Industrial Heating Magazine, pages 38 through 47.

THE INVENTION

We have now discovered that the corrosion resistance properties of fused alumina ($Al_2O_3$) as well as fused alumina-chromia ($Al_2O_3.Cr_2O_3$) can be greatly improved by the addition of chromium metal powder to unfused alumina in the binder phase. This chromium metal which is added to the binder before the refractory item is cast or formed is apparently oxidized to chromium oxide during the firing used to produce the refractory. Presence of the chromium improves the bond strength and the corrosion resistance.

According to the method of our invention either alumina powder alone or a mixture of alumina and chromia powder is heated to fusion to form a fused grain material. This fused grain material is then crushed to a powder and to this powder is added a binder comprising unfused alumina powder and chromium metal powder. Water is added to make a slurry and the slurry is then formed into the desired shape. Heating at a sufficiently elevated temperature for sufficient time drives off the water from the slurry, converts the chromium metal to chromium oxide and reaction sinters the refractory powder mixture together to form the desired refractory shape. If desired the binder added to the fused grain powder may contain calcium aluminate powder. The calcium aluminate serves as a green binder to hold the mass together prior to heating and converts to $Al_2O_3$ and CaO during firing.

The embodiment of the invention where the chromium metal powder is added to the alumina binder which is used with the fused chromia-alumina mixture, this mixture can consist of from 60 to 85 weight percent of aluminum oxide and the balance chromium oxide. Preferred proportions are 75 percent aluminum oxide and 25 percent chromium oxide. Both in this embodiment and where alumina alone is used the crushed refractory powder employed is at least as fine as 16 Tyler mesh. In the embodiment involving alumina alone the refractory powder mixture with binder contains from 45 to 55 weight percent of fused grain powder and the balance binder with about 50 weight percent of fused grain powder preferred. In the case of the chromina-alumina mixture the percentage of fused grain powder is from 60 to 71 weight percent with the balance binder and the preferred amount is about 66 weight percent. In both embodiments the preferred percentage of unfused alumina powder in the refractory powder mixture is from 18 to 28 percent of the total. The preferred percentage for alumina alone is about 21.5 weight percent while for alumina-chromia mixtures the preferred percentage is about 22.5 weight percent. This unfused alumina is preferably at least as fine as 325 Tyler mesh.

The percentage of chromium metal powder added with the unfused alumina binder in the fused alumina refractory powder mixture should be at least 17 weight percent of the total powder mixture, with a preferred range of from 20 to 30 weight percent and about 24 weight percent most preferred. For the fused alumina-chromia refractory powder the chromium metal powder should constitute at least 5 weight percent of the total mix with a preferred range of 7.5 to 9 weight percent and about 8 weight percent most preferred. For both embodiment of the invention the chromium metal powder should be at least as fine as 15 microns in particle size, with an average size of about 5 microns most preferred. When calcium aluminate powder is added to the binder in the refractory mixture the percent of calcium aluminate is preferably from 3 to 6 weight percent, with about 4 weight percent most preferred.

The heating of the formed or molded slurry of refractory material must be done carefully to avoid difficulties. Oxidation of the chromium metal to chromium oxide, which is complete at a temperature of about 1000° C., changes the volume of the formed object and hence the heating is best done slowly. Raising the temperature to 1000° C. at a rate of 40° C. per hour is preferred. This gradual heating also avoids the formation of steam and attendant disruption of the formed object as the slurry water is driven off. Above 1000° C. the rate of heating can be increased to 150°–200° C. per hour. The rate of heating which can be safely used will vary with the thickness of the formed object and can be readily selected by one skilled in the art. Once the preferred final temperature of 1400° C. to 1700° C. is reached it need be maintained only for a time sufficient to insure that the temperature is achieved uniformly throughout the shaped object.

The examples which follow illustrate the invention in both embodiments, that is, with the mixture of chromium metal and unfused alumina added to fused alumina as described in Example II and with the chromium metal and unfused alumina added to fused grain chromia-alumina as described in Example I. Control samples without the added chromium metal/unfused alumina were run for both examples and comparison of the flexural strength and sand blast penetration clearly show the benefits of the invention.

EXAMPLE I

In this example the mold used produced a hollow cylinder 24 inches long with a 1 inch diameter center hole and a 5 inch outside diameter. Prior to placing the mix in the mold all interior surfaces of the mold were coated with petroleum jelly. The mixture used contained 26.4 pounds (66 weight percent) of fused grain $Al_2O_3$-$Cr_2O_3$ (Alumina-Chromia) powder which had been made by blending one part by weight of unfused $Cr_2O_3$ (Chromia) through 65 Tyler mesh powder with three parts by weight of unfused $Al_2O_3$ (Alumina) through 65 Tyler mesh powder, heating the blend to fusion at a temperature above 2000° C. and then cooling, crushing and grinding it until it passes through 16 Tyler mesh. Present as binder in the mixture was 9.0 pounds (22.5 weight percent) of unfused $Al_2O_3$ (Chromia) through 325 Tyler mesh powder, supplied by Aluminum Company of America as Grade T-61, as well as 1.6 pounds (4.0 weight percent) of 2 $Ca0.5$ $Al_2O_3$ (Calcium Aluminate) through 200 Tyler mesh powder and 3.0 pounds (7.5 weight percent) of chromium metal powder particles of average size of about 5 microns in diameter, all percentages being on a dry basis. Five pounds of water were also used in the mixture, amounting to 12.5 parts of water per hundred parts of the dry mix.

Half the water was added to a Hobart mixing bowl then the fused grain alumina-chromia powder was added. After one minute of blending the unfused alumina powder and the chromia powder were added, with 1.5 minutes of additional blending. The rest of the water and then the calcium aluminate were added, followed by 3 minutes of blending. The mold was then placed on a vibrator and the mixture was poured from the Hobart bowl into the mold under vibration, the vibration not being strong enough to "boil" the mixture. Wet burlap was placed over the mold and the mold was then removed approximately 15 hours after casting.

The temperature of the air atmosphere around the molded hollow cylinder was gradually raised to 1600° C. in the following manner. It was first raised from 25° C. to 80° C. at the rate of 20° C./hour and held at 80° C. for 10 hours. It was then raised to 177° C. at the rate of 25° C./hour and held at 177° C. for 10 hours. Next it was raised to 677° C. at the rate of 25° C./hour and held at 677° C. for 10 hours. After then being raised to 1000° C. at the rate of 38° C./hour. It was held at 1000° C. for 24 hours. Finally the temperature was raised to 1600° C. at the rate of 150° C./hour and held at 1600° C. for 2 hours, after which the cylinder was furnace cooled to ambient temperature.

After cooling the molded cylinder was tested for flexural strength and also subjected to a sand blast penetration test, the latter being intended to simulate impingement of gases on the material during the erosion process. The cylinder had a flexural strength of 3720 pounds per square inch as compared to 2235 pounds per square inch for a control cylinder made without added chromium metal. The sand blast penetration for the cylinder made according to this example was only 0.065 inches as compared to 0.600 inches of penetration on the control cylinder.

The control cylinder made for comparison with the cylinder of this example was made using the same technique and equipment as the cylinder of the example, with all times, temperature and other conditions being the same. The mix used consisted of 67.3 weight percent of the same type and size of fused grain $Al_2O_3$ — $Cr_2O_3$ (alumina-chromia powder made in the manner as the example, 28.9 weight percent of the same type of unfused $Al_2O_3$ (alumina) powder and 3.8 weight percent of the same type and size of 2 $Ca0.5$ $Al_2O_3$ (calcium aluminate) powder, all percentages being on a dry basis. Water was added to the dry mix in the amount of 11.9 parts of water per 100 parts of the dry mix.

EXAMPLE II

In this example the mold used produced a brick 12 inches long by 4 inches high by 4 inches wide. Prior to placing the mix in the mold all interior surfaces of the mold were coated with petroleum jelly. The mixture used contained 20.8 pounds (50.7 weight percent) of fused grain $Al_2O_3$ (Alumina) through 54 Tyler mesh powder supplied by the Norton Co. as Grade CA-334. Present as binder in the mixture was 8.8 pounds (21.5 weight percent) of unfused $Al_2O_3$ (Alumina) through 325 Tyler mesh powder, supplied by Aluminum Co. of America as Grade T-61, as well as 1.6 pounds (3.9 weight percent) of 2 $Ca0.5$ $Al_2O_3$ (Calcium Aluminate) through 200 Tyler mesh powder and 9.8 pounds (23.9 weight percent) of chromium metal powder particles of average size of about 5 microns in diameter, all percentages being on a dry basis. Four pounds of water were also used in the mixture, amounting to 9.75 parts of water per hundred parts of the dry mix.

Half the water was added to a Hobart mixing bowl then fused grain alumina-chromia powder was added. After 1 minute of blending the unfused alumina powder and the chromia powder was added, with 1.5 minutes of additional blending. The rest of the water and then the calcium aluminate were added, followed by 3 minutes of blending. The mold was then placed on a vibrator and the mixture was poured from the Hobart bowl into the mold under vibration, the vibration not being strong enough to "boil" the mixture. Wet burlap was placed over the mold and the mold was then removed approximately 15 hours after casting.

The temperature of the air atmosphere around the molded brick was gradually raised to 1600° C. in the following manner. It was first raised from 25° C. to 80° C. at the rate of 20° C./hour and held at 80° C. for 10 hours. It was then raised to 177° C. at the rate of 25° C./hour and held at 177° C. for 10 hours. Next it was raised to 677° C. for 10 hours. After then being raised to 1000° C. at the rate of 38° C./hour. It was held at 1000° C. for 24 hours. Finally the temperature was raised to 1600° C. at the rate of 150° C./hour and held at 1600° C. for 2 hours, after which the brick was furnace cooled to ambient temperature.

After cooling the molded brick was tested for flexural strength and also subjected to a sand blast penetration test, the latter being intended to simulate impingement of gases on the material during the erosion process. The brick had a flexural strength of 6800 pounds per square inch as compared to 1610 pounds per square inch for a control brick made without added chromium metal. The sand blast penetration for the brick made according to this example was only 0.040 inches as compared to 0.880 inches of penetration on the control brick.

The control brick made for comparison with the brick of this example was made using the same technique and equipment as the brick of the example, with all times, temperature and other conditions being the same. The mix used consisted of 96 weight percent of the same type and size of fused grain $Al_2O_3$ (Alumina) powder from the same source as the example and 4 weight percent of the same type and size of 2 $Ca0.5$ $Al_2O_3$ (calcium aluminate) powder, all percentages being on a dry basis. Water was added to the dry mix in the amount of 13.5 parts of water per 100 parts of the dry mix.

What is claimed is:

1. Method of producing a shaped article of improved refractory material having high flexural strength and high resistence to physical erosion by and chemical attack by molten metals, which method comprises the steps of:
   (a) heating to fusion $Al_2O_3$ powder to form a fused grain material,
   (b) crushing said fused grain material to a fused grain powder,
   (c) adding to said fused grain powder a binder comprising unfused $Al_2O_3$ powder and chromium metal powder to form a refractory powder mixture,
   (d) adding water to said refractory powder mixture to make a slurry,
   (e) forming said slurry in a desired shape,
   (f) heating said formed slurry only in an oxidizing atmosphere at a sufficiently elevated temperature and for a sufficient time to complete the conversion of the chromium metal to chromium oxide and form a reaction sintered bond, and
   (g) cooling the thus formed shaped article to ambient temperature.

2. Method according to claim 1 wherein the crushing in step b) produced a powder at least as fine as 16 Tyler mesh.

3. Method according to claim 1 wherein the refractory powder mixture formed in step (c) contains from 45 to 55 weight percent of fused grain powder from step (b) and the balance binder.

4. Method according to claim 1 wherein the refractory powder mixture formed in step (c) contains about 50 weight percent of fused grain powder from step (b) and the balance binder.

5. Method according to claim 1 wherein the binder added in step (c) additionally contains calcium aluminate powder.

6. Method according to claim 1 wherein the refractory powder mixture formed in step (c) contains from 18 to 28 weight percent of unfused $Al_2O_3$ powder.

7. Method according to claim 1 wherein the refractory powder mixture formed in step (c) contains about 21.5 weight percent of unfused $Al_2O_3$ powder.

8. Method according to claim 1 wherein the unfused $Al_2O_3$ powder added in step (c) is at least as fine as 325 Tyler mesh.

9. Method according to claim 1 wherein the refractory powder mixture formed in step (c) contains at least 17 weight percent of chromium metal powder.

10. Method according to claim 1 wherein the refractory powder mixture formed in step (c) contains from 20 to 30 weight percent of chromium metal powder.

11. Method according to claim 1 wherein the refractory powder mixture formed in step (c) contains about 24 weight percent of chromium metal powder.

12. Method according to claim 1 wherein the chromium metal powder added in step (c) is at least as fine as 15 microns.

13. Method according to claim 1 wherein the chromium metal powder added in step (c) has an average particle size of 5 microns.

14. Method according to claim 1 wherein the refractory powder mixture formed in step (c) contains from 3 to 6 weight percent of calcium aluminate powder.

15. Method according to claim 1 wherein the refractory powder mixture formed in step c) contains about 4 weight percent of calcium aluminate powder.

16. Method according to claim 1 wherein the temperature in step (f) is between about 1400° C. and 1700° C.

17. Method according to claim 1 wherein the temperature in step (f) is about 1650° C.

18. Method of producing a shaped article of improved refractory material having high flexural strength and high resistance to physical erosion by and chemical attack by molten metals, which method comprises the steps of:
   (a) heating to fusion powders of $Al_2O_3$ and $Cr_2O_3$ to form a fused grain material,
   (b) crushing said fused grain material to a fused grain powder,
   (c) adding to said fused grain powder a binder comprising unfused $Al_2O_3$ powder and chromium metal powder to form a refractory powder mixture,
   (d) adding water to said refractory powder mixture to make a slurry,
   (e) forming said slurry in a desired shape,
   (f) heating said formed slurry only in an oxidizing atmosphere at a sufficiently elevated temperature and for a sufficient time to complete the conversion of the chromium metal to chromium oxide and form a reaction sintered bond, and
   (g) cooling the thus formed shaped article to ambient temperature.

19. Method according to claim 18 wherein the mixture in step (a) consists of from 60 to 85 weight percent $Al_2O_3$ and the balance $Cr_2O_3$.

20. Method according to claim 18 wherein the mixture in step (a) consists of about 75 weight percent $Al_2O_3$ and about 25 weight percent $Cr_2O_3$.

21. Method according to claim 18 wherein the crushing in step (b) produced a powder at least as fine as 16 Tyler mesh.

22. Method according to claim 18 wherein the refractory powder mixture formed in step (c) contains about 66 weight percent of fused grain powder from step (b) and the balance binder.

23. Method according to claim 18 wherein the refractory powder mixture formed in step (c) contained from 60 to 71 weight percent of fused grain powder from step (b) and the balance binder.

24. Method according to claim 18 wherein the binder added in step (c) additionally contains calcium aluminate powder.

25. Method according to claim 18 wherein the refractory powder mixture formed in step (c) contains from 18 to 28 weight percent of unfused $Al_2O_3$ powder.

26. Method according to claim 18 wherein the refractory powder mixture formed in step (c) contains about 22.5 weight percent of unfused $Al_2O_3$ powder.

27. Method according to claim 18 wherein the unfused $Al_2O_3$ powder added in step (c) is at least as fine as 325 Tyler Mesh.

28. Method according to claim 18 wherein the refractory powder mixture formed in step (c) contains at least 5 weight percent of chromium metal powder.

29. Method according to claim 18 wherein the refractory powder mixture formed in step (c) contains from 7.5 to 9 weight percent of chromium metal powder.

30. Method according to claim 18 wherein the refractory powder mixture formed in step (c) contains about 8 weight percent of chromium metal powder.

31. Method according to claim 18 wherein the chromium metal powder added in step (c) is at least as fine as 15 microns.

32. Method according to claim 18 wherein the chromium metal powder added in step (c) has an average particle size of 5 microns.

33. Method according to claim 18 wherein the refractory powder mixture formed in step (c) contains from 3 to 6 weight percent of calcium aluminate powder.

34. Method according to claim 18 wherein the refractory powder mixture formed in step (c) contains about 4 weight percent of calcium aluminate powder.

35. Method according to claim 18 wherein the temperature in step (f) is between about 1400° C. and 1700° C.

36. Method according to claim 18 wherein the temperature in step (f) is about 1650° C.

* * * * *